June 25, 1963 A. EPSTEIN ET AL 3,095,330
THERMOELECTRICITY
Filed Dec. 7, 1959
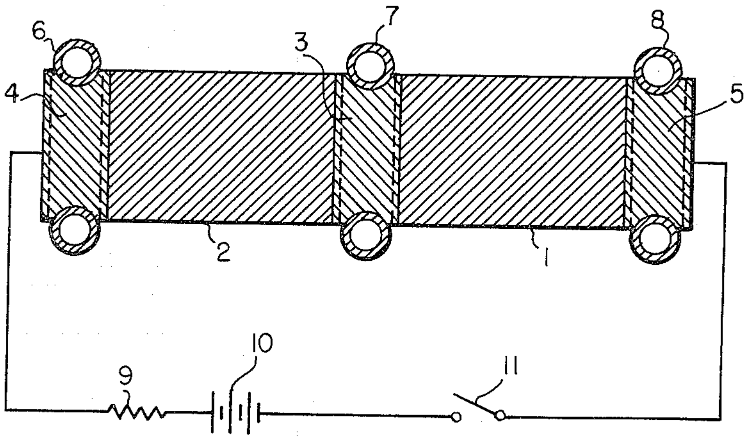
INVENTORS
ARNOLD EPSTEIN
STANLEY M. KULIFAY
BY Herman O. Bauermeister
ATTORNEY United States Patent Office 3,095,330

Patented June 25, 1963

3,095,330

THERMOELECTRICITY

Arnold Epstein and Stanley M. Kulifay, Dayton, Ohio, assignors to Monsanto Chemical Company, St. Louis, Mo., a corporation of Delaware Filed Dec. 7, 1959, Ser. No. 857,892

13 Claims. (Cl. 136—5)

The present invention relates to thermoelectric compositions which are of utility for the direct conversion of electricity in either cooling or heating processes, and also the generation of electricity by the application of heat to the novel bodies of the present invention. The present invention relates to methods of manufacturing the said bodies of the novel thermoelectric composition as articles of manufacture. The invention also relates to the use of the said bodies in devices such as thermocouples, thermistors, radiation detectors, pyrometers, and thermorelays.

The thermoelectric materials contemplated in the present invention include consolidated forms of finely divided particles of modified binary, ternary, and higher, compositions such as silver antimonide, copper antimonide, silver selenide, copper selenide, silver telluride and copper telluride as well as other combinations of silver and/or copper with antimony, selenium or tellurium. The said compositions, both stoichiometric and non-stoichiometric, are used as such or as modified or doped by the addition thereto of an agent selected from the group consisting of manganese, silver, selenium, tellurium, copper, nickel, mercury, lead, cadmium, bismuth, antimony, thallium, gold, ruthenium, rhodium, osmium, iridium, platinum, palladium, indium, cobalt, tin and arsenic. The proportion of the doping additive including the use of one binary added to another as the dopant or additive is broadly in the range of less than 15% by weight, or preferably from 0.005 to 15% by weight, or still more preferably a range of from 0.01 to 10% by weight.

The compositions of the present invention include both N-type and P-type materials. An example of an N-type composition is consolidated $Ag_2Se$, while an example of a P-type composition is a consolidated particulate mixture of equal weights of $Cu_2Se$ and $Cu_2Sb$.

The thermoelectric materials contemplated in the present invention are consolidated forms of finely-divided particles. The consolidation of the discrete particles is effected by various pressing operations. The particles of the powder are obtained by chemical coprecipitation or from a fused, e.g., densiform solid by grinding, comminution or abrasion. Such mechanical subdivision to obtain the powder is carried out with a pressed or unpressed solid-state reaction mixture of the individual component elements, or a mixture of powders.

The present invention is carried out employing discrete particles of the desired composition as the starting material. Such finely-divided or powdered materials are obtained by various methods, such as by mechanical abrasion and dispersion methods, e.g. grinding and pulverizing, or by chemical precipitation methods such as by coprecipitation of the finely-divided binary and higher compositions from solutions of the desired components precipitated by hydrazine and other precipitating agents.

The size of the particles can be varied over a wide range and it has been found that exceedingly finely-divided particles are effective in the present relationship. It is preferred that the particles be of less than 2,500 micron diameter. However, very finely-divided particles, such as 50 micron particles and even smaller for example 10 micron diameter particles have been found to operate very efficiently in the present method. A still more preferred particle size range is from 0.01 to 1,000 microns.

The formation of thermoelectric bodies in accordance with the present invention is carried out by consolidating the discrete particles by subjecting them to a pressure of at least 500 pounds per square inch, or preferably at least 1,000 pounds per square inch. Higher pressures may be used as desired and pressures of the order of 2,500 to 200,000 pounds per square inch have been found useful for this purpose. A suitable temperature range is from a temperature of 30° C. to a temperature of 50° C. below the melting point, while a preferred temperature range is from 50° C. to 600° C. A still more preferred temperature range is from 75° C. to 500° C. The use of higher pressures makes it possible to operate with lower temperatures.

In the practice of the present invention, heating times of 5 minutes to 24 hours, or preferably, of 15 minutes to 2 hours are effective.

The present process is based upon the consolidation of the individual particles into a shaped mass of superior thermoelectric properties for use in various specific applications. In a preferred embodiment of the invention, this pressed piece is heated as described above to further improve the thermoelectric properties. The pressing and heating may be combined in a so-called "hot pressing" operation in which a heated die is employed to provide both pressure and the desired temperature as a unitary process.

It has been found that the products thus obtained are characterized by an ultimate structure based upon the original particulate form and differ radically from a cast e.g. densiform or melted type of product. Thus in the measurement of the thermoelectric properties of the compositions of the present invention, it has been found that far superior results are obtained by the employment of particulate starting materials subjected to elevated pressure and temperatures in contrast to the same materials melted to a liquid state and allowed to solidify such as by casting, extruding and other melt processes.

The mechanism by which modification of the thermoelectricity properties is obtained by doping has not been completely elucidated. However, it has been found that the range of $10^{14}$ to $10^{17}$ carriers per cc., that is from 0.000001% to 0.001% by weight, of additives or dopants characteristic of typical semi-conductor compositions, e.g., in transistors, and rectifiers and diodes are not effective in the present thermoelectric compositions.

It has been found that when the above basic matrix compositions and the modified derivatives thereof are used in a powdered form, particularly as particles of less than 2,500 microns diameter and preferably in the particle size range of from 0.01 to 1,000 microns diameter, and subjected to a pressing step, the resultant product is improved. Additional heat treatment, or sintering, gives even further improvement. The improvement is shown in the gain of thermoelectric utility over the prior art compositions as revealed by the so-called "figure of merit" Z, defined as the ratio of the Seebeck coefficient or thermoelectric power S, squared to the product of the electrical resistivity $\rho$, and thermal conductivity, K.

$$Z=\frac{S^2}{\rho K}$$

Ref.: (Semiconductor Thermoelements and Thermoelectric Cooling, p. 1, A. F. Ioffe, Infosearch Limited, London (1957)). The figure of merit, Z, can be seen to play an important role in thermoelectric devices used for heating, cooling, and power generation. In thermoelectric power generation, the theoretical maximum efficiency, $\eta$, obtainable is related to Z in the following way:

$$\eta=\frac{T_1-T_0}{T_1}\times\frac{\sqrt{\left(\frac{T_1+T_0}{2}\right)Z+1}-1}{\sqrt{\left(\frac{T_1+T_0}{2}\right)Z+1}+\frac{T_0}{T_1}}$$

where $T_1$=temp. at hot junction
$T_0$=temp. at cold junction ibid. Part 1, chapter 2, p. 40, A. F. Ioffe.

For thermoelectric cooling the maximum theoretical coefficient of performance, $\epsilon_0$, is related to Z as follows:

$$\epsilon_0=\frac{T_1}{T_0-T_1}\times\frac{\sqrt{1+\frac{T_0+T_1}{2}Z}-\frac{T_0}{T_1}}{\sqrt{1+\frac{1}{2}(T_0+T_1)Z}+1}$$

$\epsilon_0$=coefficient of performance
$T_0$=the warmer, and
$T_1$=the cooler junction temperature Part 2, chapter, I, Ioffe, p. 99, 115.

It has been found that the use of finely divided particulate forms of the above-described metal compounds and their doped modifications when pressed (both sintered and unsintered) yield excellent products regardless of the particle size. However, superior results are obtained with the range of particle sizes of from 0.01 to 1000 microns. The consolidation of the particles to obtain a thermoelectric body as an article of manufacture is preferably carried out by (*a*) employing cold pressing followed by a sintering step, or by (*b*) a unitary hot pressing method. When a cold press operation is employed, the particles are subjected to a pressure of at least 500 p.s.i., or preferably over 1000 p.s.i., and most preferably from 2,500 to 200,000 pounds per square inch. The compressed or compacted piece thus obtained has been found usually to have an improved figure of merit in thermoelectric applications. However, if the pressed or compacted article is then heated at the temperatures designated below, a greatly superior product is obtained.

In addition to the cold-pressed material subjected to a heat treatment or sintering as described above, the powder material may also be fabricated by a hot pressing treatment. In hot pressing the range of pressures is the same as described above for cold pressing.

It has been found that the present process is advantageously carried out in the vicinity of the transition temperature such as within 50° C. or more broadly, within 100° C. of the transition temperature (low-temperature to the high temperature phase). It has been found that the various modifying or doping agents may affect the normal phase transition point. In the case of silver selenide it is noted that this change with increasing temperature is from the $\beta$-(beta)-low temperature phase to the $\alpha$-(alpha)-high temperature phase. For all the materials contemplated in the present invention, both in the unitary hot pressing embodiment and in the cold pressing with subsequent heat treatment, a suitable temperature range is from 30° C. to a temperature which is 50° C. below the melting point, while a preferred temperature range is from 50° C. to 600° C. A still more preferred temperature range is from 75° C. to 500° C.

The following examples illustrate specific embodiments of the present invention.

*Example 1*

While the exact mechanism of the physical and chemical behavior of the present thermoelectric bodies has not been completely elucidated, it would appear that the product thus obtained differs from conventional thermoelectric materials (such as bismuth telluride) and methods of preparation thereof in the following ways:

(1) The material as prepared in the powder form by the precipitation method lends itself easily to a (crystal) disordering process but yet retains chemical and thermodynamic stability within the framework of utility.

(2) It is usually found that compressed or compacted powders exhibit electrical resistivities which may be poorer than those found for the same material, when fused, such as by melting and casting. However, the present powder, when compressed or compacted, exhibits surprisingly desirable electrical resistivities and other electrical properties (of thermoelectric utility). The present invention makes it possible to achieve an unforeseen improvement in thermal conductivity, K, even though the commonly used ratio of the thermoelectric power squared to the electrical resistivity ($S^2/\rho$) for the fused and compacted powder are comparable.

This is noted especially in the following example, where the electrical and thermal properties of a fused and compacted powder sample are compared.

| | $Ag_2Se$ | |
|---|---|---|
| | Fused | Pressed powder |
| Electrical resistivity, $\rho$, ohm cm. | $8.52 \times 10^{-4}$ | $3.75 \times 10^{-4}$. |
| Seebeck coefficient, S, $\mu$v./deg. | 120 | 74. |
| $S^2/\rho$ | $1.68 \times 10^{-5}$ | $1.46 \times 10^{-5}$. |
| Thermal conductivity, K, cal./cm. sec. deg. | $3.12 \times 10^{-3}$ | $2.19 \times 10^{-3}$. |
| Conductivity type | N | N. |
| Figure of merit, Z temp. = 27° C. | $1.3 \times 10^{-3}$ | $1.6 \times 10^{-3}$. |

*Example 2*

A further example of the advantages of the compacted powder may be seen in the high figures of merit that can be obtained in comparison to fused material by sintering the compact in vacuum of $10^{-2}$–$10^{-3}$ mm. Hg. (Sintering can also be done using other conventional methods such as inert gas blanketing with vacuum, atmospheric, or super-atmospheric pressures.)

| | Fused | $Ag_2Se$+0.1% Se, pressed | |
|---|---|---|---|
| | | Unsintered | Sintered at 200° C. for total time of 1 hour (press $10^{-2}$–$10^{-3}$ mm. Hg) |
| $\rho$(ohm cm.) | $8.6 \times 10^{-4}$ | $6.32 \times 10^{-4}$ | $7.7 \times 10^{-4}$. |
| S($\mu$v/deg.) | 120 | 74 | 117. |
| K (cal./cm. sec. deg.) | $3.12 \times 10^{-3}$ | $2.16 \times 10^{-3}$ | $7.58 \times 10^{-4}$. |
| Conductivity type | N | N | N. |
| Z | $1.3 \times 10^{-3}$ | $1.0 \times 10^{-3}$ | $5.6 \times 10^{-3}$. |

NOTE.—Above properties measured at 27° C.

*Example 3*

In some instances, high figures of merit can be obtained even without sintering. Such was found for the sample $Ag_2Se$+0.1% copper. The pertinent electrical and thermal properties are reviewed below. The figure of merit calculated from the experimental data $>8\times10^{-3}$ at room temperature.

| | $Ag_2Se+0.1\%$ Cu |
|---|---|
| ρ (ohm-cm.) | $1.46\times10^{-4}$. |
| S (μv./deg.) | 76. |
| K (cal./cm. sec. deg.) | $1.17\times10^{-3}$. |
| Conductivity type | N. |
| Z | $8.1\times10^{-3}$. |

*Example 4*

It will be noted that the above is a doped material. The attainement of the high figure of merit has been found to be a consequence of the addition of a dopant which may create a certain disordering quality in the material or a gradient (variation of concentration of dopant from one end of sample to other) such that the particular electrical and thermal properties are found, with the aid of sintering, generally, to improve and give rise to particularly desirable thermoelectric features.

To illustrate the effect of doping at several concentrations, the following data show the variation in figure of merit for silver selenide undoped as well as with a low and a higher addition of selenium.

| | $Ag_2Se$ | $Ag_2Se+.01\%$ Se | $Ag_2Se+.1\%$ Se |
|---|---|---|---|
| ρ(ohm cm.) | $6.8\times10^{-4}$ | $3.75\times10^{-4}$ | $2.93\times10^{-4}$. |
| S(μv./deg.) | 95 | 104 | 98. |
| K (cal./cm. sec. deg.) | $1.49\times10^{-3}$ | $1.73\times10^{-3}$ | $1.41\times10^{-3}$. |
| Conductivity type | N | N | N. |
| Z | $2.1\times10^{-3}$ | $4.0\times10^{-3}$ | $5.5\times10^{-3}$. |

NOTE.—T=25° C.

*Example 5*

It is known in the art that generally conventional thermoelectric materials such as bismuth telluride, $Bi_2Te_3$, follow the Wiedemann-Franz rule (An Introduction to Semiconductors, Dunlap, W., J. Wiley and Sons, Inc., 1957, p. 104, 109). This rule states that, at room temperature, the product of the thermal conductivity and electrical resistivity is a constant. (This is based upon the premise that electrons are the source of both electrical and thermal conductivity.) Consequently, a change (at room temperature) in the electrical resistivity is reflected in a corresponding change in the thermal conductivity in keeping with the framework of the rule.

It is, of course, understood that the total value of measured thermal conductivity (K) may be thought of as being composed of the electronic component of thermal conductivity ($K_{el}$) and the lattice or phonon contribution ($K_{ph}$): $K=K_{el}+K_{ph}$. For conventional thermoelectric materials, the electronic contribution of the thermal conductivity may be calculated from the above Wiedemann-Franz rule if the electronic resistivity is known and one assumes a relatively well-order lattice. For most materials such as for example, fused bismuth telluride this has been found to be the case.

In contrast, the herein-described materials, when prepared and doped as indicated by the precipitation method in the form of finely-divided powders and then pressed and properly sintered (or heat treated) display quite different characteristics. For example, for a given electrical resistivity at room temperature, the Wiedemann-Franz rule, when applied to the particular material, may provide an electronic component of the thermal conductivity which is considerably higher than the total (experimentally) measured value of thermal conductivity at room temperature. Such a result may be noted in the following example ($Ag_2+0.75\%$ Se).

| Sample and history | $Ag_2Se+0.75\%$ Se: Electrical resistivity (T=23° C.) (ohm cm.) | Total measured thermal conductivity (T=23° C.) (cal./cm. sec. deg.) | Electronic component, thermal conductivity (T=23° C.), calc. from Wiedemann-Franz rule (cal./cm. sec. deg.) |
|---|---|---|---|
| Pressed at 20,000 lbs./in.² | $5.82\times10^{-4}$ | $2.57\times10^{-3}$ | $1.90\times10^{-3}$. |
| Sintered at 200° C. for 15 min. (heating and cooling (rate equals 3 deg./min.) (pressure of $10^{-2}$–$10^{-3}$ mm. Hg). | $6.35\times10^{-4}$ | $1.66\times10^{-3}$ | $1.58\times10^{-3}$. |
| Sintered at 200° C. for additional 15 min. (heating and cooling rate equals 3 deg./min.) (pressure of $10^{-2}$–$10^{-3}$ mm. Hg). | $6.45\times10^{-4}$ | $1.17\times10^{-3}$ | $1.55\times10^{-3}$. |

Stated another way, it is noted from the above example that the thermal conductivity appears to change much faster than expected if one uses the conventional Wiedemann-Franz rule and the electrical resistivity as a guide. It will further be observed that the change in thermal conducivity is almost independent of the change in electrical resistivity especially when it is seen that the electrical resistivity has changed by less than 10% and the thermal conductivity has changed by a factor greater than 100% based upon the ultimate product. This procedure for obtaining relative independence of electrical resistivity and thermal conductivity is a feature of the present process.

*Example 6*

As a further example of the advantages of the present procedure utilizing finely divided powders, pressing, and sintering, on the figure of merit, experiments were carried out using $Ag_2Se+0.75\%$ Se in (*a*) powder form, (*b*) densiform state, (*c*) repowdered from densiform, in both the original state and in the sintered state. These are denoted in the table below in columns A to F. It will be noted that quite unexpectedly the finely divided powders pressed but unsintered (A) and the repowdered (finely divided) and repressed (but unsintered) fused (densiform) material (D) both show about the same figure of merit (Z) at room temperature ($T=25°$ C.) as one finds for the fused or melted $Ag_2Se+0.75\%$ Se. The figure of merit found was $1.3\times10^{-3}$. Normally one would expect the powdered material to be vastly inferior. Further, on sintering at 200° C., it is noted that the pressed powders (B, F) show much higher values of figure of merit than is found for the fused material (C, E). In the case of the material which was repowdered (finely divided) and repressed from the fused (densiform) $Ag_2Se+0.75\%$ Se and then sintered, the improvement is quite marked.

It is noted that heat treating the fused material itself at 200° C. for 15 minutes shows an improvement in figure of merit also. The merit figure increased from a value of $1.3\times10^{-3}$ to $1.5\times10^{-3}$ (D, E).

Several unexpected effects then may be noted from these experiments: (1) finely divided powders (of $Ag_2Se+0.75\%$ Se) when pressed show about the same figure of merit at $T=25°$ C. as found for fused densiform materials which are normally regarded as showing superior properties; (2) sintering under proper conditions can improve the figure of merit of pressed powders measurably over that found for fused (densiform) materials; (3) by powdering fused materials and sintering, radical improvements in figure of merit can result over that found for fused materials; (4) properly heat treating fused materials can improve the figure of merit of fused materials.

| | $Ag_2Se$+0.75% Se | | | | | |
|---|---|---|---|---|---|---|
| | A | B | C | D | E | F |
| | Powder pressed but unsintered | Powder pressed, sintered (200° C. for 30 min.) | Fused (melted) (densiform) | Fused material repowdered, repressed but unsintered | Fused (but not repowdered) and sintered (heat treated at 200° C. for 15 min.) | Fused, repowdered, repressed and sintered (200° C. for 15 min.) |
| Resistivity, $\rho$(ohm cm.) | $5.98 \times 10^{-4}$ | $9.5 \times 10^{-4}$ | $5.02 \times 10^{-4}$ | $5.33 \times 10^{-4}$ | $5.90 \times 10^{-4}$ | $8.9 \times 10^{-4}$. |
| Thermoelectric power, S (microvolts/deg.) | 80 | 123 | 108 | 75 | 107 | 179. |
| Thermal conductivity K (cal./cm. sec. deg.) | $1.88 \times 10^{-3}$ | $1.64 \times 10^{-3}$ | $4.22 \times 10^{-3}$ | $1.88 \times 10^{-3}$ | $3.09 \times 10^{-3}$ | $1.41 \times 10^{-3}$. |
| Conductivity type | N | N | N | N | N | N. |
| Figure of merit, Z | $1.4 \times 10^{-3}$ | $2.3 \times 10^{-3}$ | $1.3 \times 10^{-3}$ | $1.3 \times 10^{-3}$ | $1.5 \times 10^{-3}$ | $6.1 \times 10^{-3}$. |

NOTE.—$T$=25° C.

The present invention also includes the preparation of inorganic metal compositions, such as binary and higher tellurides and selenides, by a low-temperature precipitation method employing solutions of nitrogenous reducing agents, such as hydrazine, as a precipitating agent. Various nitrogenous reducing agents including hydrazine, hydroxylamine, and the alkyl and aryl derivatives thereof, such as phenylhydrazine, as well as salts, for example the mono- or dihydrochloride may be employed in the present invention.

It is also a part of the invention to prepare metal binary, ternary and higher compounds, such as tellurides, antimonides and selenides having a precisely-controlled stoichiometric or non-stoichiometric composition. It is also an object of the invention to prepare uniformly doped metal tellurides, antimonides and selenides, by precipitating such modified compounds by means of hydrazine, its derivatives and analogues.

In one embodiment of the present invention the process begins with the production of a solution of the desired purity containing the dissolved compounds of the specific metal or metals and of tellurium or selenium. The components may also be introduced as the respective elements or compounds which are dissolved or vaporized for further reaction. However, the invention may be carried out in any desired medium, preferably selected from the group consisting of solutions, melts and vapors. The media contemplated in the present invention embrace solutions of the metal ions, including tellurium and selenium, as well as liquid media, such as melts exemplified by molten chloride, such as selenium chloride and copper chloride. Vapor phase media are also included, for example mercuric chloride and tellurium chloride with or without a carrier gas.

The concentration employed in different circumstances will be dictated in large part by the solubility of the respective compounds, for example, chlorides or nitrates of mercury, lead, bismuth, cadmium, nickel, platinum, copper, palladium, ruthenium, rhodium, osmium, iridium, thallium, silver, gold, indium, cobalt, tin, arsenic, antimony, tellurium, and selenium. In general, the concentration of the soluble metal salt and of the soluble tellurium or selenium compound may range up to the solubility limits of the respective compounds. For example, in preparing mercury selenide, the mercuric nitrate was employed as a 20% solution, while the selenous acid was used in 10% to 15% by weight solution. The source materials of the said tellurides or selenides are preferably the acid solutions of the element or oxide or any pure, soluble compound. In general, the proportion of the nitrogenous reducing agent which is employed is 0.1 to 25.0 g. molecular weight (mole) of the said nitrogenous reducing agent per gram atomic weight of the said tellurium or selenium. A preferred range is from 1.0 to 10.0 grams molecular weights. When the reducing agents are mentioned herein, such expressions include not only the reducing agents, per se, but also the salts and derivatives, such as the hydrochlorides and hydrates in which form the said reducing agents are commonly supplied.

The solution as described above may be heated in order to increase the solubility of the respective compounds therein. The pressure under which the process is conducted is usually atmospheric, but is not critical and moderate pressure may be employed. The time required for the reaction is also a non-critical factor, although reaction appears to be complete after the first few minutes.

The precipitation of the desired metal compositions and compounds is preferably carried out by adding a combined solution or individual solutions of the said starting materials to a solution of an aqueous ammoniacal hydrazine salt such as the dihydrochloride or other nitrogenous reducing agent. However, the three solutions of the metal, the chalcogen and the reductant may also be mixed simultaneously, or by first adding the reductant to one of the reactants, or to the combined mixture. The strength of such solutions is not critical, although it is necessary to operate with an excess of the solution containing the reductant such as ammoniacal hydrazine dihydrochloride. The present invention may employ either a liquid medium for the precipitation as described above, or a spray-type of precipitation employing liquid sprays of some of the starting materials, such as the metal salts and/or the reducing agent.

The above discussion has been concerned chiefly with the preparation of stoichiometric compounds. However, non-stoichiometric compositions may readily be made by the present method by employing an excess of either the metal or the chalcogen. For example, an excess of 1% by weight of mercury introduced in the preparation of mercury selenide results in the production of a uniform product having 1% mercury as free metal in excess of the theoretical HgSe. The working solutions described above may also contain therein any desired soluble doping compound capable of reduction to the element by the reducing agent, such as copper, silver, gold or the platinum metals.

The temperature employed in carrying out the invention may be from 20° C. to 100° C. in aqueous systems or 20° C. to 200° C. in vapor systems in order to obtain a reduction to the desired metal compound or composition.

Another embodiment of the present invention based upon the precipitation of binary, and mixed compounds, such as ternary and higher compounds by nitrogenous reducing agents is the employment of a complexing agent in the precipitation. Preferred complexing agents in the present invention include the group of tartaric acid, citric acid and malic acid. It has been found that the use of the said complexing agents makes it possible to carry out the precipitation with more highly concentrated solutions without incurring the precipitation of metal hydroxides or other contaminating basic compounds. The proportion of the complexing agents, such as tartaric acid, may be varied widely, such as over the range of from 0.1% to 20% by weight relative to the weight of the total solution present. The precipitating agents may also be employed as salts, for example the mono- and dihydrochloride salts.

The following examples illustrate specific embodiments of the present invention.

*Example 7*

The preparation of mercury selenide, HgSe, was carried out by first weighing out 19.9810 g. of mercury which was dissolved by warming with 100 ml. of 1:1 nitric acid. The selenium was provided as 7.8645 g. of the element, in equivalent stoichiometric proportion with the mercury. The selenium was dissolved with 90 ml. of 2:1 nitric acid (2 volumes $HNO_3$ to 1 volume of water). The selenium and mercury solutions were thoroughly mixed.

A solution containing the hydrazine precipitating agent was prepared from 500 ml. to 10% hydrazine dihydrochloride in water, 500 ml. of water and 500 ml. of ammonium hydroxide. This solution was heated to boiling, after which the solution of mixed mercury and selenium compounds was added thereto with constant stirring. A black precipitate of mercury selenide, which formed during the stirring operation, soon formed a dense, black powder. After boiling for 90 minutes, the product was obtained by filtering the solution and washing the precipitate with water, followed by methanol. The product was dried at 70° C. under vacuum and the yield was 97.5% (small mechanical losses occur in preparation). It was analyzed by X-ray diffraction analysis and was found to be face-centered cubic in structure and to have the stoichiometric proportion of the compound HgSe. The lattice constant for the compound was 6.077° Angstroms. No other crystalline material, such as uncombined Se, could be detected.

*Example 8*

The preparation of copper selenide, $Cu_2Se$, was conducted by first dissolving 14.7079 g. of copper metal in a dilute nitric acid solution, to which there was then added 9.1386 g. of selenium element dissolved in 75 ml. 2:1 nitric acid. This combined solution was slowly poured into a boiling solution of aqueous hydrazine dihydrochloride rendered ammoniacal with ammonium hydroxide. The product was produced as a black, cubic microcrystalline powder which was subjected to X-ray diffraction analysis and found to have the X-ray powder diagram of $Cu_2Se$.

*Example 9*

Beta-silver selenide having a formula, $Ag_2Se$, was prepared utilizing 21.5792 g. of silver metal dissolved in dilute nitric acid, to which there was then added 7.8972 g. of selenium dissolved in dilute nitric acid. The mixed solutions were then made ammoniacal and added to boiling aqueous ammoniacal hydrazine dihydrochloride prepared in accordance with the method of Example 1. The product was obtained in 99.6% yield as a black microcrystalline powder whose D values for the calculation of the lattice constant agreed with those in the literature (ASTM). No uncombined Ag or Se could be detected.

*Example 10*

Silver telluride having the formula, $Ag_2Te$, was prepared from 21.5877 g. of silver metal dissolved in dilute nitric acid, to which there was then added 12.7679 g. of tellurium dissolved in 1:1 aqua regia. The mixed solutions were then made ammoniacal and precipitated by addition to ammoniacal aqueous hydrazine dihydrochloride to obtain in 99.5% yield a black microcrystalline ortho-rhombic powder. This was tested by X-ray diffraction analysis and was found to correspond to the formula, $Ag_2Te$, and to have lattice constants of $a_0=16.27$, $b_0=26.68$, $c_0=7.55$. No uncombined Ag or Te could be detected.

*Example 11*

A method of precipitating in the presence of a complexing agent to inhibit hydrolytic contamination was also employed, using about 5% by weight of tartaric acid relative to the weight of the total solution to produce bismuth selenide, $Bi_2Se_3$, and thallium selenide, TlSe. The respective products were black, microcrystalline materials. The ASTM X-ray powder data for the $Bi_2Se_3$ sample was found to agree with that in the literature. The thallium selenide, like the $Bi_2Se_3$ was recovered in substantially quantitative yield and found to contain no detectable free thallium, selenium, or thallous chloride.

*Example 12*

The preparation of a body of silver selenide for thermoelectric purposes was carried out by beginning with very finely divided powdered silver selenide prepared as in Example 3, above. The average particle size of this material was 10 microns with the particle size distribution ranging from 0.3 to 250 microns. The mass of powder was placed in the die of a high pressure Carver press and subjected to a pressure of 20,000 pounds per square inch. This product was subjected to conventional testing to determine the figure of merit, Z, and was found to have a value of $1.3\times10^{-3}$ at room temperature.

The compressed material as described above was then subjected to a heat treatment by being placed in a furnace at 200° C. and $10^{-3}$ mm. Hg for a period of 15 minutes after which the product was gradually cooled. When this heat-treated body was measured for thermoelectric efficiency as shown by the figure of merit Z, the value was shown to be $3.4\times10^{-3}$ at room temperature. This value is in contrast to the figure of merit for (densiform) i.e., melted and solidified silver selenide for which the corresponding figure of merit is $1.6\times10^{-3}$ at room temperature.

The best figure of merit for any known material reported in the current literature has a Z of $2.8\times10^{-3}$, for a fused bismuth selenide-telluride doped with CuBr.

*Example 13*

The preparation of a coprecipitated product of silver selenide containing 0.1% by weight of metallic selenium was carried out exactly as described under Example 3, above, except the amounts of elements taken were as follows: 21.5760 gm. silver, and 7.9255 gm. selenium.

The sample of silver selenide powder of similar particle size range to Example 6 and containing 0.1% excess Se on the basis of the weight of $Ag_2Se$ taken was cold-pressed at 20,000 pounds per square inch to obtain a consolidated, particulate body. When the shaped body was measured for thermoelectric efficiency, the figure of merit, Z, was found to be $2.6\times10^{-3}$. When subjected to a heat treatment for 75 minutes at 199° C. and gradually cooled, the figure of merit was found to be $5.5\times10^{-3}$. Overheating to a condition more nearly approaching a fused densiform structure reduced this Z to $2.8\times10^{-3}$.

*Example 14*

A sample pellet of pressed silver telluride powder of similar particle size range to Example 6 (made as in Example 4) had a figure of merit, Z, of $0.2\times10^{-3}$ before heat treatment and a Z of $1.4\times10^{-3}$ after heating at 127° C. for 15 minutes. Overheating to 208° C. reduced this Z to $0.8\times10^{-3}$, apparently indicative of some loss of the particulate structure.

*Example 15*

The stoichiometric binary composition silver antimonide having the formula $Ag_3Sb$ was prepared as follows:

The silver source was 50.9664 grams of silver nitrate which was dissolved in 150 ml. of water. The antimony source was 33.3944 grams of $KSbOC_4H_4O_6\cdot\frac{1}{2}H_2O$ in 1100 ml. water contained in a 3000 ml. flask at room temperature. To the antimony solution was added a solution of 454 grams of 50% $H_3PO_2$ and 300 ml. of water. This mixture was then agitated while the silver nitrate solution was slowly added and further rinsed with water so as to make the addition quantitative. The entire mixture was then heated to boiling and boiled for 1½ hours. The dense, black precipitate was washed by decanting and repeatedly centrifuging with distilled water. The product was finally rinsed with methanol and subjected to vacuum-drying on a hot water bath.

The cold-pressed sample heated for 15 minutes at 100° C. gave a Z of $3.3\times10^{-3}$. Overheating to 200° C. dropped the Z to $1.7\times10^{-3}$.

*Example 16*

The preparation of a coprecipitated mixture of silver antimonide containing 0.1% by weight of metallic bismuth was carried out by preparing the respective solutions to introduce the desired ions into the reactant mixture. The silver source was 50.9664 grams of silver nitrate which was dissolved in 150 ml. of water. The bismuth source was 0.0496 gram of bismuth oxide, $Bi_2O_3$, which was disesolved in 2 ml. of 1:1 nitric acid. The antimony source was 33.3944 grams of $$KSbOC_4H_4O_6\cdot\frac{1}{2}H_2O$$

This salt was dissolved in 1,100 ml. of water contained in a 3,000 ml. flask at room temperature. When the salt was dissolved there was added 300 ml. of additional water and 454 grams of 50% $H_3PO_2$. To the antimony solution described above was added the bismuth solution with suitable rinsing of water to give a clear solution at room temperature. The mixture was then agitated while the silver nitrate solution was slowly added with further rinsing with water. The entire mixture was then heated to boiling and boiled for a period of 1½ hours. The product was obtained as a dense black precipitate which was washed by decanting and repeatedly centrifuging with distilled water. The product was finally rinsed with methanol and subjected to vacuum drying on a hot water bath. This was pressed and subjected to electrical tests and a Z value of $0.7\times10^{-3}$ obtained for a conoslidated, particulate sample which had been pressed at 20,000 p.s.i. and a Z value of $0.8\times10^{-3}$ for the further heat-treated material which had also been maintained at 75° C. for 15 minutes.

*Example 17*

In order to prepare a mechanical mixture of the components described in Examples 3 and 10, 97% by weight of the silver selenide of Example 3 was tumbled together with 3% by weight of the coprecipitated silver antimonide containing 0.1% by weight of metallic bismuth (Example 10). The mechanical mixture was pressed at 20,000 p.s.i. and subjected to electrical tests and the following data obtained:

| | 97% $Ag_2Se$+3% ($Ag_3Sb$+0.1% Bi) | |
|---|---|---|
| | Pressed, unsintered | Pressed, sintered 211° C., 15 min. $10^{-2}$–$10^{-3}$ mm. Hg |
| Resistivity, S (ohm cm.) | $5.1\times10^{-4}$ | $8.3\times10^{-4}$. |
| Thermoelectric power, ρ (μv/deg.) | 68 | 111. |
| Thermal conduct., K (cal./cm. sec. deg.) | $2.37\times10^{-3}$ | $1.33\times10^{-3}$. |
| Figure of merit, Z, 25° C | $0.9\times10^{-3}$ | $2.7\times10^{-3}$. |

*Example 18*

A mechanical mixture similar to that described in the preceding example was prepared utilizing the proportions of 99% $Ag_2Se$+1% ($Ag_3Sb$+0.1% Bi).

| | Pressed, unsintered | Pressed, sintered 200° C. total time 1 hr. $10^{-2}$–$10^{-3}$ mm. Hg |
|---|---|---|
| Resistivity, S (ohm cm.) | $6.32\times10^{-4}$ | $7.7\times10^{-4}$. |
| Thermoelectric power ρ (μv./deg.) | 74 | 117. |
| Thermal conduct., K (cal./cm. sec. deg.) | $2.16\times10^{-3}$ | $7.58\times10^{-4}$. |
| Figure of merit, Z, 25° C | $0.9\times10^{-3}$ | $5.7\times10^{-3}$. |

The drawing of the present patent application shows a specific embodiment of the invention as a thermoelectric device. The apparatus shown in the present drawing may be used for the production of cold or heated atmospheres by the application of a direct current. Various compositions contemplated within the present invention may be either N-type or P-type.

Referring to the drawing, the thermoelectric device shown is composed of two thermoelectrically different members 1 and 2 which are conductively joined by an intermediate conductive part 3 of negligible thermoelectric power. The N-type thermoelectric member 2 consists of one of the above described consolidated particulate silver selenide composition containing 0.1% by weight of excess selenium. The P-type composition is bismuth telluride. Other thermoelectrically active P-type compositions may also be used in this relationship. While it is desirable to use the present consolidated particulate forms of materials for both the P-type and N-type members, thermoelectric couples may also be formed in which one of the members is of the conventional densiform type, but the second member is a thermoelectric material of the above described invention based upon the use of finely divided materials subjected to pressure-consolidation.

The member 2 consists of an N-type thermoelectric material, according to the invention. This material may be an alloy or compound such as bismuth telluride, $Bi_2Te_3$, with the use of an additive component such as a sulfide or selenide.

The intermediate part 3 which separates the members 1 and 2 to form a thermoelectric junction between them, consists preferably of a good conductor such as copper. This material serves as a cooling terminal to cool a space, or for the removal of heat from a medium and may be contacted by a pipe coil 7 to conduct a fluid coolant to a distant location.

As used herein, the term "space" includes not only a gaseous or fluid volume but also solid objects and devices. An example of a gaseous space is that in a household refrigerator, while a device is a transistor or an infra-red detector.

Alternatively, the member 3 may be shaped as a thin vane or other structure for cooling in its immediate environment or space, such as cooling such specific area or volume as a commercial or household type of refrigerator. An energizing circuit comprising a direct current source 10, a resistor 9, and a control switch 11 is connected to the element by copper end terminals 4 and 5. The end terminals are provided with single turn pipe coils 6 and 8 through which a heat transporting fluid may be pumped to maintain them at a relatively constant temperature. Thus, when the action of the current through the thermoelectric junction produces a temperature differential between the intermediate terminal 3 and the end terminals 4 and 5, the end terminals may be maintained at a constant temperature and the intermediate one may be reduced or increased in temperature.

*Example 19*

In an arrangement as shown in the drawing of this patent application, element 2 is silver selenide doped with 0.1 wt. percent selenium, having a value of Z of about $5\times10^{-3}$. Element 1 is bismuth telluride $Bi_2Te_3$ having a Z value of about $2\times10^{-3}$. The maximum temperature differential available with zero heat input to the cold junction is about 110° C. The above results are obtained with an ambient temperature of 25° C, and a current input of about 50 amperes.

When the above couple is used for thermoelectric heating, with the reference junction at 0° C., the temperature differential is about 100° C.

*Example 20*

In the above assembly shown in the drawing, and using silver selenide, undoped, the value of Z is $2.2 \times 10^{-3}$ for element 2. Element 1 is bismuth telluride. These 2 members constitute a thermocouple pair for thermoelectric power generation. It is found that the maintenance of a temperature of 100° C. on element 3 and 0° C. on elements 4 and 5 gives a maximum power output of approximately 0.18 watt, e.g., 6 amperes at 30 millivolts.

*Example 7*

The following table summarizes additional examples of various compositions coming within the scope of the present invention as improved thermoelectric materials. (All samples were pressed at 20,000 p.s.i. except where noted.) The various compositions are designated as to type where M=metal, Md=metalloid, and N=non-metal.

of silver antimonide, copper antimonide, silver selenide, copper selenide, silver telluride and copper telluride, with the addition of a member of the class consisting of manganese, silver, selenium, tellurium, copper, nickel, mercury, lead, cadmium, bismuth, antimony, thallium, gold, ruthenium, rhodium, osmium, iridium, platinum, palladium, indium, cobalt, tin and arsenic, the said material in particulate form having been pressed at a pressure of at least 1000 p.s.i. and heated at a temperature between 50° C. and 600° C.

5. A thermoelectric body which is a consolidated, particulate silver antimonide, the said component in finely-divided form having been compressed at a pressure of at least 500 pounds per square inch and maintained at a temperature of between 30° C. and a temperature of 50° C. below the melting point.

6. A thermoelectric body which is a consolidated, particulate silver selenide, the said component in finely-divided form having been compressed at a pressure of at least 500 pounds per square inch and maintained at a temperature of between 30° C. and a temperature of 50° C. below the melting point.

7. A thermoelectric body which is a consolidated, particulate silver telluride, the said component in finely-divided form having been compressed at a pressure of at least 500 pounds per square inch and maintained at a temperature of between 30° C. and a temperature of 50° C. below the melting point.

| Composition | Type | Figure of merit, Z | | |
|---|---|---|---|---|
| | | Pressed, but not heat-treated | Pressed and heat-treated, $10^{-3}$ mm. Hg | Conditions of heat treatment |
| $Ag_2Se$+0.1% Ag | MN | $1.3 \times 10^{-3}$ | $3.4 \times 10^{-3}$ | 200° C., 1 hr. |
| 85% $Ag_2Se$ 15% ($Ag_3Sb$+0.1% Bi) | MNMd | $0.9 \times 10^{-3}$ | $2.6 \times 10^{-3}$ | 211° C., 15 min. |
| $Ag_2Se$+1% S | MN | $0.8 \times 10^{-3}$ | $2.2 \times 10^{-3}$ | 200° C., 15 min. |
| $Ag_2Se$+10% Se | MN | $0.9 \times 10^{-3}$ | $2.5 \times 10^{-3}$ | 200° C., 30 min. |
| $Ag_2Te$+0.01% Au | MMd | $1.0 \times 10^{-3}$ | $1.7 \times 10^{-3}$ | 208° C., 15 min. |
| 90% $Ag_2Se$, 10% HgSe | MN | $0.3 \times 10^{-3}$ | $1.8 \times 10^{-3}$ | 102° C., 15 min. |
| 13.3% $Cu_2Sb$, 86.7% $Ag_2Te$ | MMd | $0.7 \times 10^{-3}$ | $1.5 \times 10^{-3}$ | 102° C., 15 min. |
| $Ag_2Se_{0.25}Te_{0.75}$ | MNMd | $1 \times 10^{-3}$ | $1.4 \times 10^{-3}$ | 205° C., 15 min. |
| 95% $Ag_2Se$, 5% HgSe | MN | $0.8 \times 10^{-3}$ | $1.6 \times 10^{-3}$ | 208° C., 15 min. |
| 50% $Ag_2Se$, 50% $Ag_3Sb$ | MNMd | $0.2 \times 10^{-3}$ | $0.5 \times 10^{-3}$ | 208° C., 15 min. |
| 93.3% $Ag_2Te$, 6.7% $PdBi_2$ | MMd | $1.3 \times 10^{-3}$ | $1.5 \times 10^{-3}$ | 305° C., 15 min. |
| $PdTe_2$ | MMd | $1.3 \times 10^{-5}$ | $3.3 \times 10^{-5}$ | 109° C., 15 min. |
| 31% $Cu_2Sb$, 69% $Ag_2Te$ | MMd | $0.3 \times 10^{-3}$ | $0.5 \times 10^{-3}$ | 102° C., 15 min. |
| HgTe | MMd | $2 \times 10^{-5}$ | $3 \times 10^{-5}$ | 205° C., 30 min. |
| CuSe | MN | $0.5 \times 10^{-5}$ | $1.9 \times 10^{-5}$ | 102° C., 15 min. |
| Equimolar mixture PbSe+$Ag_2Se$ | MN | $4 \times 10^{-5}$ | $9 \times 10^{-5}$ | 211° C., 15 min. |
| $Ag_3PS_{.4}$ | MN | $0.14 \times 10^{-8}$ | $1 \times 10^{-8}$ | 135° C., for 15 min.<br>200° C., for 15 min. |
| $Ag_2Se$+2% I | MN | $0.4 \times 10^{-3}$ | $1.4 \times 10^{-3}$ | 135° C., for 15 min. |
| $Ag_2Se$+10% Cu | MN | $0.6 \times 10^{-3}$ | $1.7 \times 10^{-3}$ | 200° C., for 15 min. |
| $Ag_2Se$+1% $O_2$ | MN | $1.0 \times 10^{-3}$ | $2.9 \times 10^{-3}$ | 200° C., for 15 min. |
| $Ag_2Se$+10% I | MN | $0.9 \times 10^{-3}$ | $1.3 \times 10^{-3}$ | 135° C., for 15 min. |
| $Ag_2Se$+1% Sb | MNMd | $0.5 \times 10^{-3}$ | $1.7 \times 10^{-3}$ | 200° C., for 15 min. |
| $PdBi_2$ | MM | $5 \times 10^{-8}$ | $5.4 \times 10^{-8}$ | 200° C., for 15 min. |
| $PtTe_2$ | MMd | $1.3 \times 10^{-6}$ | $8.7 \times 10^{-6}$ | 400° C., for 15 min. |
| 50% $Cu_2Sb$+50% $Cu_2Se$ (pressed at 5,000 lbs./in.$^2$). | MNMd | $5 \times 10^{-7}$ | $4.7 \times 10^{-6}$ | 200° C., for 15 min. |

What is claimed is:

1. A thermoelectric body which is composed of at least one composition selected from the group consisting of silver antimonide, copper antimonide, silver selenide, copper selenide, silver telluride and copper telluride, the said components in finely-divided form having been compressed at a pressure of at least 500 pounds per square inch and maintained at a temperature of between 30° C. and a temperature of 50° C. below the melting point.

2. A thermoelectric material which is composed of at least one composition selected from the group consisting of silver antimonide, copper antimonide, silver selenide, copper selenide, silver telluride and copper telluride, the said material in particulate form having been pressed at a pressure of at least 1000 p.s.i. and heated at a temperature between 50° C. and 600° C.

3. A thermoelectric material which is composed of at least one composition selected from the group consisting of silver antimonide, copper antimonide, silver selenide, copper selenide, silver telluride and copper telluride, the said material in particulate form having been pressed at a pressure of at least 1000 p.s.i. and heated at a temperature between 75° C. to 500° C.

4. A thermoelectric material which is composed of at least one composition selected from the group consisting 8. A thermoelectric body which is a consolidated particulate copper antimonide, the said component in finely-divided form having been compressed at a pressure of at least 500 pounds per square inch and maintained at a temperature of between 30° C. and a temperature of 50° C. below the melting point.

9. A process of cooling which comprises applying a direct current to a body which is composed of at least one composition selected from the group consisting of silver antimonide, copper antimonide, silver selenide, copper selenide, silver telluride and copper telluride, which body has been pressed at a pressure of from 500 to 200,000 pounds per square inch from a powder form existing as particles of from 0.01 to 1,000 microns, and the said pressed material sintered at a temperature between 75° C. and 500° C. for a time of from 15 minutes to 2 hours.

10. A process of generating electricity which comprises applying a temperature differential to a body which is composed of at least one composition selected from the group consisting of silver antimonide, copper antimonide, silver selenide, copper selenide, silver telluride and copper telluride, the said body having electrical leads attached thereto, and the said material in particulate form having been pressed at a pressure of at least 1000 p.s.i. and heated at a temperature between 50° C. and 600° C.

11. A thermoelectric body with the addition of a member of the class consisting of manganese, silver, selenium, tellurium, copper, nickel, mercury, lead, cadmium, bismuth, antimony, thallium, gold, ruthenium, rhodium, osmium, iridium, platinum, palladium, indium, cobalt, tin and arsenic the said components in finely-divided form having been compressed at a pressure o fat least 500 pounds per square inch and maintained at a temperature of between 30° C. and a temperature of 50° C. below the melting point.

12. Process for the manufacture of a thermoelectric body which comprises consolidating a mass which is composed of at least one composition selected from the group consisting of silver antimonide, copper antimonide, silver selenide, copper selenide, silver telluride and copper telluride, by applying thereto a pressure of at least 500 pounds per square inch, and maintaining the said consolidated mass at a temperature of from 30° C. to a temperature which is 50° C. below the melting point.

13. Process for the manufacture of a thermoelectric body which comprises consolidating a mass which is composed of at least one composition selected from the group consisting of silver antimonide, copper antimonide, silver selenide, copper selenide, silver telluride and copper telluride, with the addition of a member of the class consisting of manganese, silver, selenium, tellurium, copper, nickel, mercury, lead, cadmium, bismuth, antimony, thallium, gold, ruthenium, rhodium, osmium, iridium, platinum, palladium, indium, cobalt, tin and arsenic, by applying thereto a pressure of at least 500 pounds per square inch, and maintaining the said consolidated mass at a temperature of from 30° C. to a temperature which is 50° C. below the melting point.

References Cited in the file of this patent

UNITED STATES PATENTS

| | | |
|---|---|---|
| 2,229,482 | Telkes | Jan. 21, 1941 |
| 2,289,152 | Telkes | July 7, 1942 |
| 2,397,756 | Schwarz | Apr. 2, 1946 |
| 2,597,752 | Salisbury | May 20, 1952 |
| 2,902,528 | Rosi | Sept. 1, 1959 |
| 2,952,980 | Douglas | Sept. 20, 1960 |

FOREIGN PATENTS

| | | |
|---|---|---|
| 836,944 | Germany | Apr. 17, 1952 |

OTHER REFERENCES

ASTIA, AD241, 247, August 10, 1959, pages 1–4.